(12) United States Patent
Munson, Jr.

(10) Patent No.: US 7,614,397 B1
(45) Date of Patent: Nov. 10, 2009

(54) SOLAR ENERGY STORAGE SYSTEM

(75) Inventor: David Murray Munson, Jr., Dallas, TX (US)

(73) Assignee: FOI Group, LLC, Dallas, TX (US)

( * ) Notice: Subject to any disclaimer, the term of this patent is extended or adjusted under 35 U.S.C. 154(b) by 532 days.

(21) Appl. No.: 11/199,654

(22) Filed: Aug. 9, 2005

Related U.S. Application Data

(60) Provisional application No. 60/599,983, filed on Aug. 9, 2004.

(51) Int. Cl.
*F24J 2/34* (2006.01)

(52) U.S. Cl. ............... 126/617; 126/618; 126/619; 126/620; 165/104.11; 165/104.18

(58) Field of Classification Search .......... 126/677, 126/688–691, 572–577, 600–608, 617–620; 165/104.13, 104.17, 104.18, 104.28, 104.22, 165/104.25, 104.31, 104.34
See application file for complete search history.

(56) References Cited

U.S. PATENT DOCUMENTS

| | | | | |
|---|---|---|---|---|
| 1,697,591 A | * | 1/1929 | Dowd, Jr. ................. | 165/6 |
| 2,205,698 A | * | 6/1940 | Schmitt ................... | 206/112 |
| 3,029,596 A | * | 4/1962 | Johnston et al. .......... | 60/524 |
| 3,817,322 A | | 6/1974 | Asselnam et al. | |
| 3,908,632 A | * | 9/1975 | Poulsen .................. | 126/643 |
| 3,972,316 A | * | 8/1976 | Alkasab .................. | 126/643 |
| 3,998,206 A | | 12/1976 | Jahn | |
| 4,002,032 A | | 1/1977 | Bash | |
| 4,018,212 A | | 4/1977 | Hein et al. | |
| 4,037,579 A | | 7/1977 | Chubb | |
| 4,077,849 A | * | 3/1978 | Ziehm, Jr. ............... | 202/205 |
| 4,128,096 A | * | 12/1978 | Katz ...................... | 126/601 |
| 4,136,668 A | | 1/1979 | Davis | |
| 4,138,293 A | * | 2/1979 | Ziehm, Jr. ............... | 202/180 |
| 4,146,057 A | | 3/1979 | Friedman et al. | |
| 4,244,350 A | * | 1/1981 | Chubb .................... | 126/400 |
| 4,273,101 A | * | 6/1981 | Merges .................. | 126/643 |
| 4,312,328 A | * | 1/1982 | Leyman, III ............ | 126/627 |
| 4,367,726 A | * | 1/1983 | Maes, Jr. ................ | 126/590 |
| 4,449,515 A | * | 5/1984 | Nilsson, Sr. ............. | 126/618 |
| 4,454,865 A | | 6/1984 | Tammen | |
| 4,459,973 A | * | 7/1984 | Royer .................... | 126/617 |
| 4,727,930 A | * | 3/1988 | Bruckner et al. ......... | 165/111 |
| 4,841,946 A | | 6/1989 | Marks | |
| 5,417,052 A | * | 5/1995 | Bharathan et al. ........ | 60/783 |
| 5,518,554 A | | 5/1996 | Newman | |
| 5,578,140 A | | 11/1996 | Yogev et al. | |

(Continued)

*Primary Examiner*—Kenneth B Rinehart
*Assistant Examiner*—Jorge Pereiro
(74) *Attorney, Agent, or Firm*—D. Scott Hemingway; Hemingway & Hansen, LLP

(57) ABSTRACT

A method and apparatus for storing, transporting, and releasing high grade, thermodynamically useful energy for a wide variety of uses. Solar energy is collected and reflected onto a heat storage container using a three-mirror reflecting system. This invention involves a method of heating the heat storage container using a primary, secondary, and tertiary system, which has a core that is partially comprised of an aluminum alloy and a metallic shell with a higher melting point than the aluminum alloy contained within. Once heated, the storage containers can then be transported to different storage areas in order to heat secondary storage containers or can be used in processes such as cooking, powering heat engines, water heating, absorption refrigeration, or drying garbage, waste, or biomass.

29 Claims, 9 Drawing Sheets

U.S. PATENT DOCUMENTS

| | | | |
|---|---|---|---|
| 5,593,549 A * | 1/1997 | Stirbl et al. | 203/10 |
| 6,231,197 B1 * | 5/2001 | Nakamura | 359/853 |
| 6,313,391 B1 | 11/2001 | Abbott | |
| 6,877,508 B2 * | 4/2005 | Litwin | 126/651 |
| 6,957,536 B2 * | 10/2005 | Litwin et al. | 60/641.8 |

* cited by examiner

SOLAR ENERGY STORAGE SYSTEM

RELATED APPLICATION DATA

This application is related to Provisional Patent Application Ser. No. 60/599,983 filed on Aug. 9, 2004, and priority is claimed for this earlier filings under 35 U.S.C. §120. The Provisional Patent Application is also incorporated by reference into this utility patent application.

TECHNICAL FIELD OF THE INVENTION

An apparatus and method for capturing solar energy within a heat storage container in order to effectively and efficiently utilize the resulting heat energy by transporting, storing, and putting the energy to productive use.

BACKGROUND OF THE INVENTION

Conventional systems of photovoltaics and solar heating are hampered by high cost, low efficiency, unpredictable power output, and the need for backup power or heat sources. Much of the energy consumption in the modern age revolves around climate control, refrigeration, and the cooking of food. Solar energy potentially offers an important source of heat energy. However, collection and storage for later use has been difficult and elusive. A flexible, efficient, and effective system of collection and storage would offer expanded options for utilizing solar energy.

Many buildings and other fixed and mobile structures can potentially use a solar power based system for collecting heat energy for later use. A light-weight, practical system for collecting and storing solar energy offers numerous applications. Large buildings such as industrial parks, factories and similar installations could use solar energy for heating, cooling, or industrial applications. Large buildings such as found with large retail outlets, factories, or warehouse could install solar energy collection facilities on their roofs to collect solar energy.

The modern military relies on both portable and semi-portable kitchens to provide food for forces in the field. Such systems are equipped with either electric heating elements or gas burners. Associated disadvantages of such systems include the need for fuel and the corresponding logistical problems of supplying the necessary fuel to various military encampments all over the world. A solar-based cooking and heating system would offer important advantages.

This invention provides a system for independently producing heat as well as providing for a consumable source of electricity that includes fixed, mobile, or semi-mobile embodiments. The self-contained solar heat collection storage system can collect heat used to cook food, power heat engines, facilitate absorption refrigeration or adsorption cooling, heat water, and dry out garbage, waste, and biomass. The resulting heat source is non-toxic, non-explosive, and reusable. Such a system would offer expanded, practical applications for solar energy by effectively and efficiently collecting heat and storing that heat for later use.

SUMMARY OF THE INVENTION

This invention absorbs, stores, transports, and releases high-grade thermodynamically useful solar energy for a wide variety of uses. The invention consists of a method of heating heat storage containers using a solar radiation collection mirror array to heat the heat storage containers, which have cores that are partially composed of an aluminum alloy mixture. In this invention, the storage containers are rotated in and out of a solar energy collection point by a conveyor system and can then be transported to different storage areas to heat secondary storage containers or to be used in processes such as cooking, powering heat engines, water heating, absorption refrigeration, or adsorption cooling. The energy collection point is located at a focal point of solar energy reflected and collected by a three-level reflector system of primary, secondary, and tertiary reflectors. The heat storage containers can also be used to dry garbage, waste, or biomass to be used for fuel or simply to facilitate disposal. The uses of the heat storage containers vary as the temperature levels change. As soon as an heat storage container cools to a non-useful temperature, it is recycled through the system to absorb, store, and transport the energy so that it can be released and utilized in a highly efficient manner.

DETAILED DESCRIPTION OF THE PREFERRED EMBODIMENTS

This invention is an energy absorption and distribution system in which mobile heat storage containers can be transported to areas in need of a clean and reliable source of energy. The invention uses a three-level arrangement of mirror reflectors to concentrate solar energy onto the mobile heat storage containers and conserve heat during this process.

Figure 1:
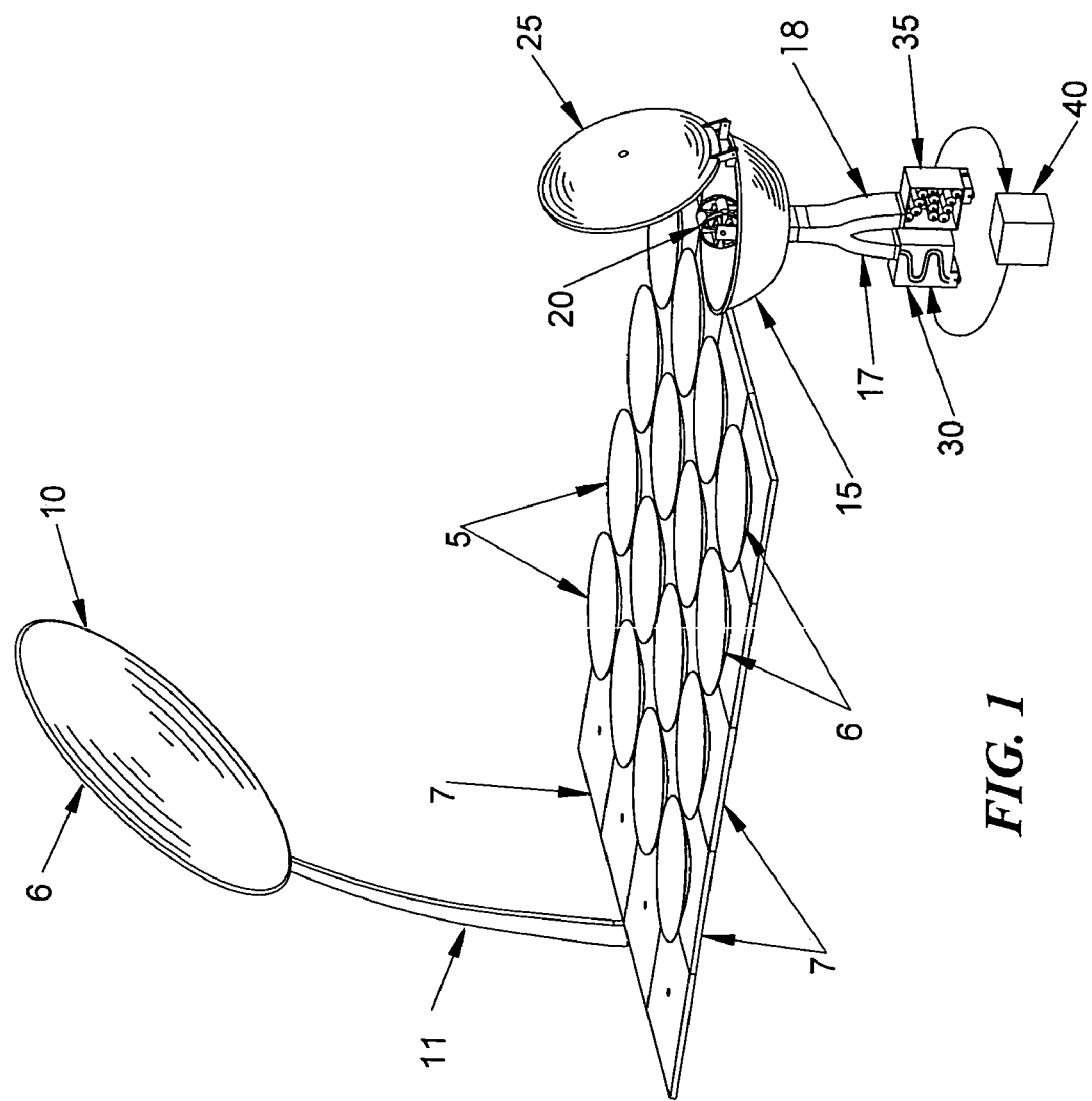
FIG. 1 shows an embodiment of a three-mirror level mirror system that includes multiple primary mirrors.

FIG. 1 shows a basic arrangement for the invention that can be used on any flat surface. This flat surface can also be a building roof, vehicle roof (e.g. parked truck trailer, rail car, aircraft, etc), or other constructs.

An array of primary mirrors 5 are arranged on a mounting surface 7. Although a flat surface is envisioned, other embodiments may be designed that are used on irregular surfaces. This primary mirror array 5 collects and concentrates solar energy onto a secondary mirror 10. At least one of these mirrors (e.g. on each mirror in the entire mirror array 5 or the secondary mirror 10) are preferably equipped with a two-axis sun tracking mechanism 6 to more effectively collect solar energy, however, in some possible designs applications, the mirrors may be fixed. This tracking system 6 can be found at the interface between the underside of mirror 5 and platform 7, or the backside of mirror 10 and its support structure 11.

The solar energy is reflected from the secondary mirror 10 to a tertiary reflector 15. The tertiary reflector 15 is a parabolic mirror that collects the solar energy from the secondary mirror 10 and reflects the collected energy onto an heat storage container 20. There is an insulating lid 25 that fits over the top of the tertiary reflector 15. The insulating lid 25 includes an automatic drop mechanism sensitive to either solar energy impacting the tertiary reflector 15 or the temperature of the heat storage container 20. This drop mechanism will lower the insulating lid 25 over the storage container 20 to prevent heat loss caused by cloud cover or other loss of solar energy that leads to loss of heat from the heat storage container 20, and reopen once that heat loss would cease.

The heat storage container 20 is moved from a solidified storage and return area 30 to the position above the tertiary reflector 15 by a conveyor system. The conveyor system passes through a first support leg 17 to above the tertiary reflector 15 where the heat storage container 20 is heated. Once the heat storage container 20 is heated and the metal alloy within it is molten or heated to a desired temperature, the conveyor system moves it down through a second support leg 18 to molten storage area 35. The molten storage area 35 is insulated to help contain the heat of the heat storage containers 20. These heated heat storage containers 20 are then moved from the heat storage area by the conveyor system or another conveyor or similar transporting system to a heat engine application 40 that usefully employs the heat energy. Potential applications include powering cooling applications, industrial applications, power applications, conductive heating, and radiant heating. After being used and cooled, the heat storage containers 20 are transported back to the solidified storage and return area 30 for recycling to reheat.

Figure 2:
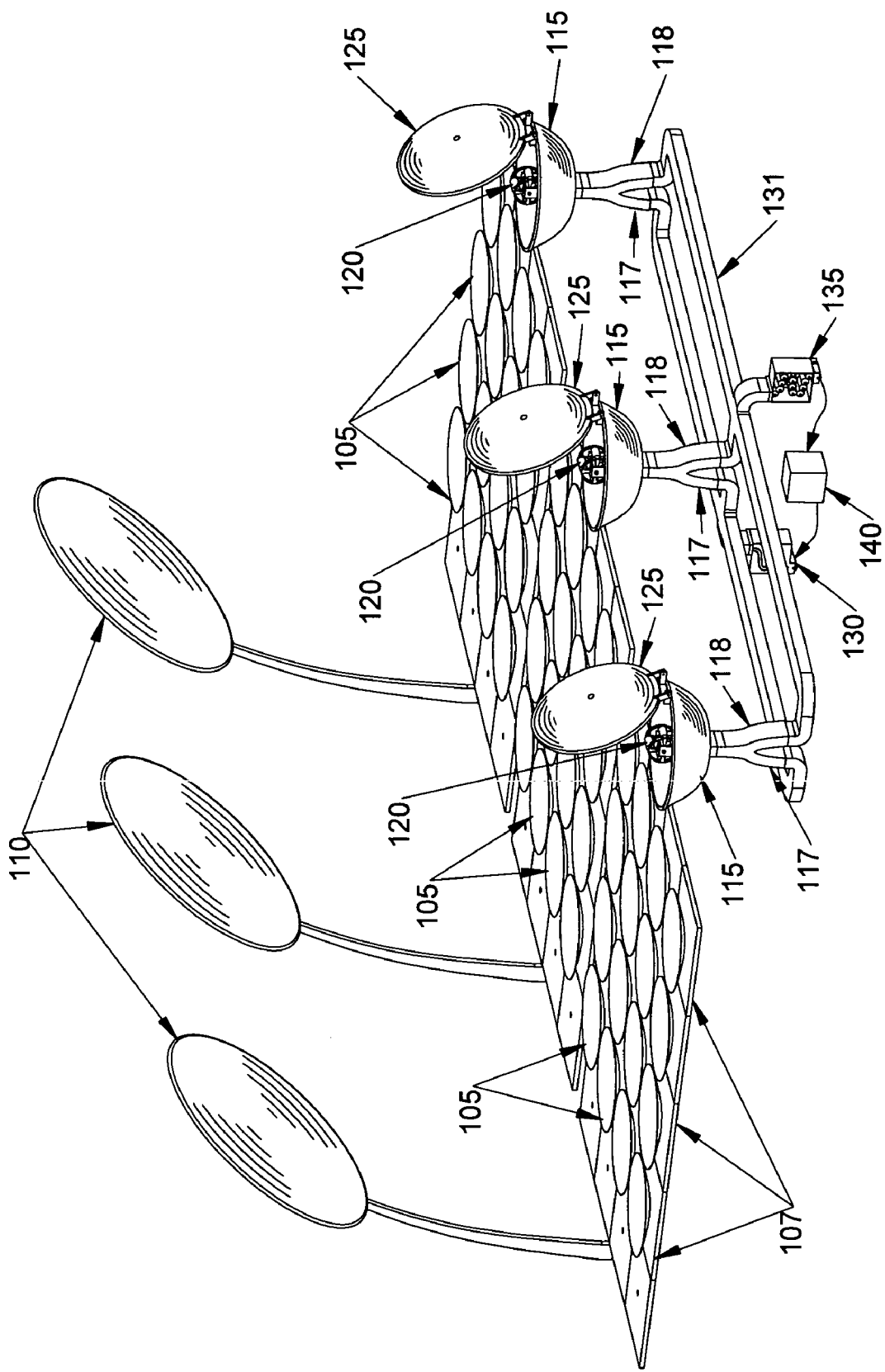
FIG. 2 shows an embodiment using multiple secondary and tertiary reflecting mirrors.

FIG. 2 shows an alternative embodiment of FIG. 1 employing multiple secondary mirrors. An array of primary mirrors 105 are arranged on a mounting surface 107. In this embodiment, the primary mirror array 105 collects and concentrates solar energy onto multiple secondary mirrors 110. Such an arrangement can be used to more efficiently collect solar energy and it offers greater potential power since greater power production is available from this configuration. At least one set of these mirrors (e.g. each mirror in the entire mirror array 105 or the secondary mirror 110) are preferably equipped with a two-axis sun tracking mechanism to more effectively collect solar energy, however, in some possible designs applications, the respective mirror structures 105 or 110 may be fixed.

The solar energy is reflected from the secondary mirrors 110 to a corresponding tertiary reflector 115. The tertiary reflectors 115 are a parabolic mirror collecting the solar energy from the secondary mirrors 110 to reflect the collected energy onto heat storage containers 120. There is an insulating lid 125 that fits over the top of each of the tertiary reflectors 115. The insulating lids 125 include an automatic drop mechanism sensitive to either solar energy impacting the tertiary reflectors 115 or the temperature of the heat storage container 120. This drop mechanism will lower the insulating lids 125 over the storage containers 120 to prevent heat loss caused by cloud cover or other loss of solar energy that leads to loss of heat from the heat storage container 120 and reopens the lid once that loss of solar energy ceases.

The heat storage containers 120 are moved from a solidified storage and return area 130 to solar collection point above the tertiary reflector 115 by a conveyor system 131. The conveyor system 131 passes through a first support leg 117 to above the tertiary reflectors 115 where the heat storage containers 120 are heated. Once the heat storage containers 120 are heated and the metal alloy within the containers 120 are molten or heated to a desired temperature, the conveyor system 131 moves down through a second support leg 118 to molten storage area 135. The molten storage area 135 is insulated to contain the heat of the heat storage containers 120. These heated heat storage containers 120 are then moved from the heat storage area by the conveyor system or another conveyor or similar transporting system to a heat engine application 140 that usefully employs the heat energy. After being used and cooled, the heat storage containers 120 are transported to the solidified storage and return area 130.

Figure 3:
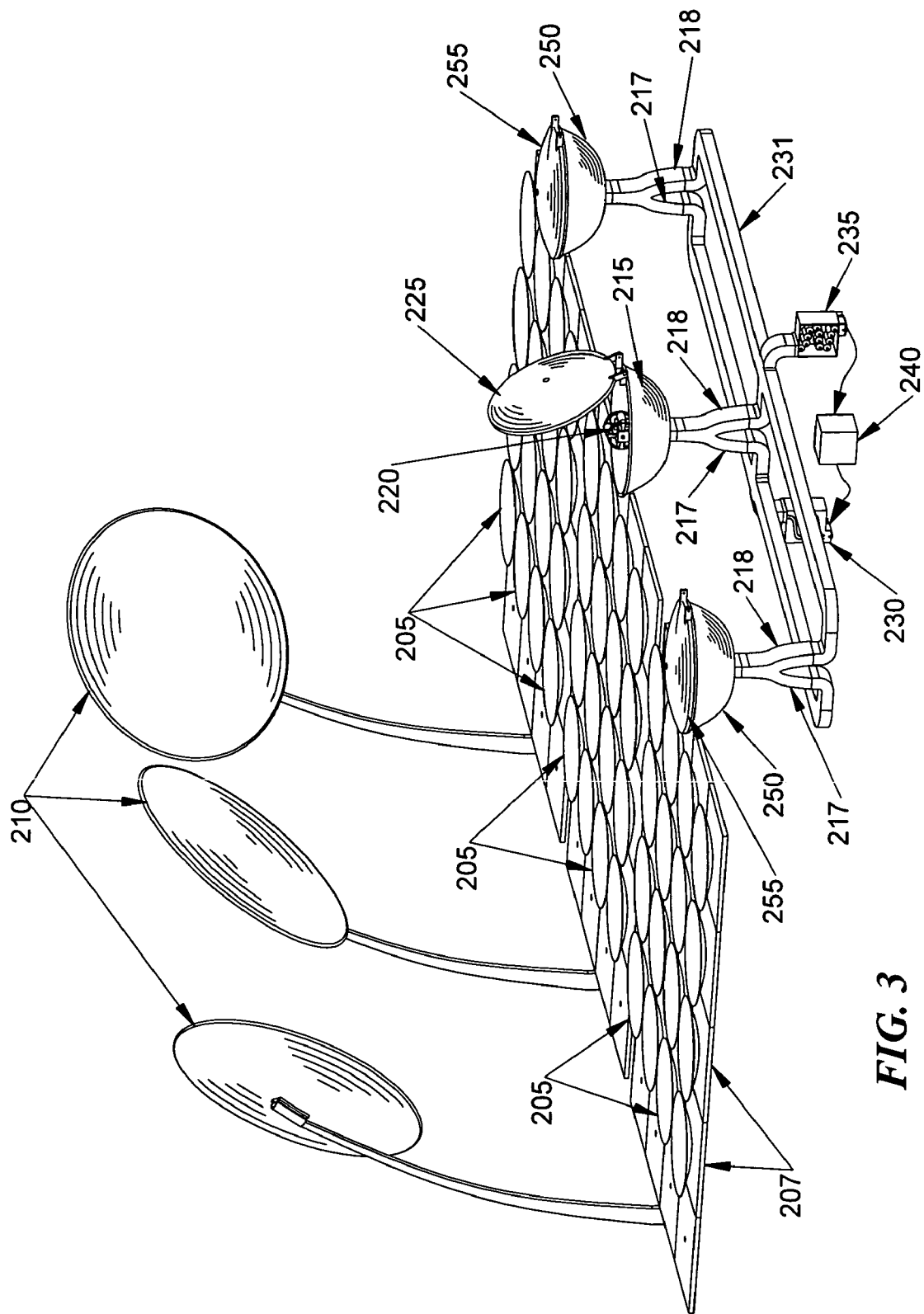
FIG. 3 shows another embodiment of FIG. 2 wherein multiple secondary mirrors reflect solar energy to a single tertiary mirror.

FIG. 3 shows another embodiment alternative of FIG. 1 employing multiple secondary mirrors. An array of primary mirrors 205 are arranged on a mounting surface 207. In this embodiment, the primary mirror array 205 collects and concentrates solar energy onto multiple secondary mirrors 210. At least one set of these mirrors (e.g. each mirror in the entire mirror array 205 or the secondary mirror 210) are preferably equipped with a two-axis sun tracking mechanism to more effectively collect solar energy, however, in this embodiment, each of the secondary mirrors 210 are mounted on a system that can shift the focus onto at least one single tertiary reflector 215 (e.g. at least two tertiary reflectors).

One deficiency in prior art applications is an inability to adapt to changing solar energy conditions caused by clouds. In this embodiment, the solar energy is reflected from several secondary mirrors 210 to a single tertiary reflector 215 and can be used to compensate for decreased solar energy (e.g. clouds) or to concentrate solar energy to achieve higher heat loads for specific requirements or demands. Other tertiary reflectors 250 (shown closed off) are available in this embodiment, but the available collected solar energy is concentrated upon a single tertiary reflector 215. The tertiary reflectors 215 and 250 are parabolic mirrors collecting the solar energy from the secondary mirrors 210 to reflect the collected energy onto a single heat storage container 220. There is an insulating lid 225 and 255 that fits over the top of each of the tertiary reflectors 215 and 250.

The insulating lids 225 and 255 include an automatic drop mechanism sensitive to either solar energy impacting the tertiary reflectors 215 and 255 or the temperature of the heat storage container 220. In this embodiment, this drop mechanism has lowered the insulating lids 255 over the tertiary reflectors 250, either to contain remaining heat or simply to cover the conveyor mechanism during non-use. The insulating lids 225 and 255 lower over the storage containers 220 to prevent heat loss caused by cloud cover or other loss of solar energy that leads to loss of heat from the heat storage containers 220. In further response, this embodiment repositions the secondary mirrors 210 focus onto the single tertiary reflector 215 to compensate for the loss of sunlight intensity and maintain the heat on a single, exposed heat storage container 220.

The heat storage containers 220 are moved from a solidified storage and return area 230 to the position above the tertiary reflector 215 by a conveyor system 231. The conveyor system 231 passes through a first support leg 217 to above the tertiary reflectors 215 where the heat storage containers 220 are heated. The support legs 217 are also present on the tertiary reflectors 250 that are sealed off, but it is envisioned that an automatic bypass system operates so that heat storage containers 220 are not moved into the inactive, closed tertiary reflectors 250. Once the heat storage container 220 is heated and the metal alloy within the container 220 is molten or heated to a desired temperature, the conveyor system 231 moves it down through a second support leg 218 to a molten storage area 235. This second support leg 218 is also present on the tertiary reflectors 250, but the other legs are envisioned to be bypassed and not operating. The molten storage area 235 is insulated to contain the heat of the heat storage containers 220, which can act to reheat other cooling heat storage containers 220. These heated heat storage containers 220 are then moved from the heat storage area by the conveyor system or another conveyor or similar transport system to a heat engine application 240 that usefully employs the heat energy. After being used and cooled, the heat storage containers 220 are transported to the solidified storage and return area 230 for recycling and reheating.

In these embodiments shown in FIGS. 1, 2, and 3, the size of the mirrors is primarily dependent on the power application and the attendant power generation desired for the system. To minimize wind loading on the secondary mirror's structure, the size of the mirrors preferably will be between one and four meters in diameter. However, the more important consideration for most applications will be required power. The mirrors may also be composed of a light-weight polished metal, such as aluminum, heavier construction such as polished stainless steel, mirrored glass, mirrored composite, or even individual replaceable modules assembled onto a base composite or skeletal structure to form the larger mirror structure.

An array of more than one primary mirror jointly aimed at an overhead secondary mirror offers significant advantages over a large single primary mirror system. Each primary mirror can move as needed to focus its reflected solar flux onto the secondary mirror. At times when less solar heat energy is required, one or more primary mirrors may be redirected to reduce total system heat flux. The secondary mirror can focus the solar energy to one or more heat receiving points where the heat storage containers can be heated to design temperature. The tertiary reflectors mounted below the containers to redirect solar radiation onto the containers helps to more efficiently capture available solar radiation and more evenly heat the containers. The upper lid which automatically closes when insufficient solar radiation is available helps to retain heat within the containers due to clouds or at the end of the day.

The conveyor system can also be fairly sophisticated to aid solar energy collection. During periods of high solar flux, it permits cyclically heating several containers at once for short intervals followed by a time of heat redistribution within each container to prevent the outer shell from being overheated by intense solar flux. During periods of low solar flux, one or more containers may remain static in the focal point for heating for longer periods to reach desired temperatures. Because the containers radiate heat outward, the ability of the conveyor system to heat a variable number of containers minimizes this heat loss, and offers the ability to operate under partly cloudy conditions. It is also possible to heat lower melting point containers during such conditions for lower temperature loads such as absorption refrigeration or other lower temperature applications.

Figure 4:
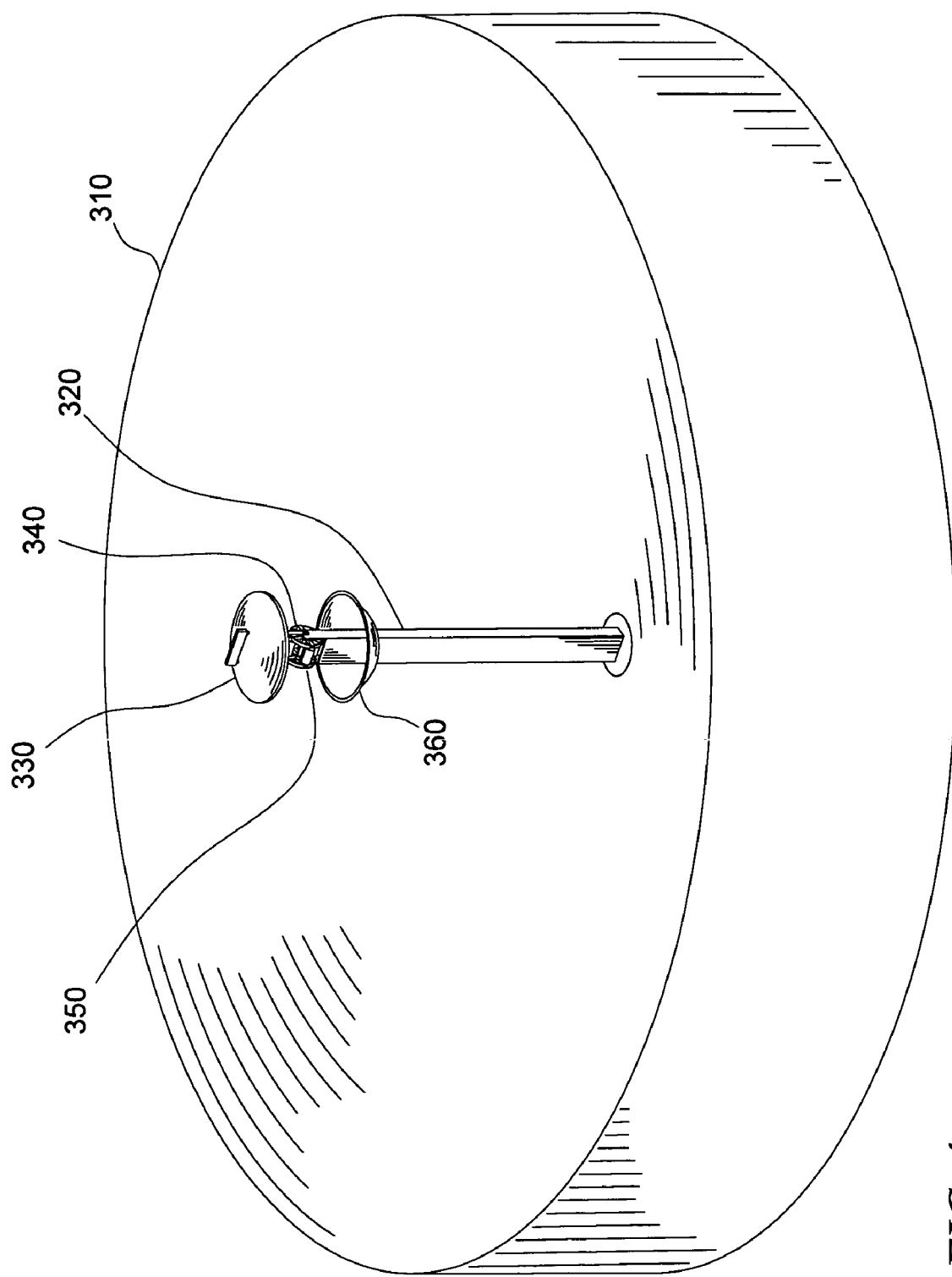
FIG. 4 shows an embodiment comprised of an inflatable parabolic mirror with a transfer tube mounted in the center.

In another embodiment that utilizes solar energy shown in FIG. 4, the mirror system comprises an inflatable or rigid parabolic mirror 310 that is approximately ten meters in diameter that has a transfer tube 320 located in the center of the circular structure. The transfer tube 320 is rigid and constructed of metal, ceramic material, or a composite. At the top of the transfer tube 320 is the secondary reflector 330 that reflects the solar rays from the parabolic mirror 310 down onto the collection point 340 as well as a tertiary reflector 360 that also reflects solar energy onto the collection point 340, which is located at the top of the transfer tube 320. In this embodiment, the secondary mirror 330 also acts as an insulating lid and will activate to lower down and fit over the tertiary reflector 360 when either the sunlight level is reduced or the temperature of the heat storage container falls.

The combination insulating lid/secondary mirror 330 seals off heat loss. This embodiment also has a conveyor system 350 that rotates heat storage containers into and out of the of the solar energy collection point 340. A further refinement to this embodiment of the parabolic reflector adds a plastic cover forming a bubble over the entire mirror system. In this embodiment, the preferred size of the primary mirror is ten to three meters in diameter. The secondary mirror 330 may also include a two-axis tracking system for tracking the sun's movement.

Figure 5:
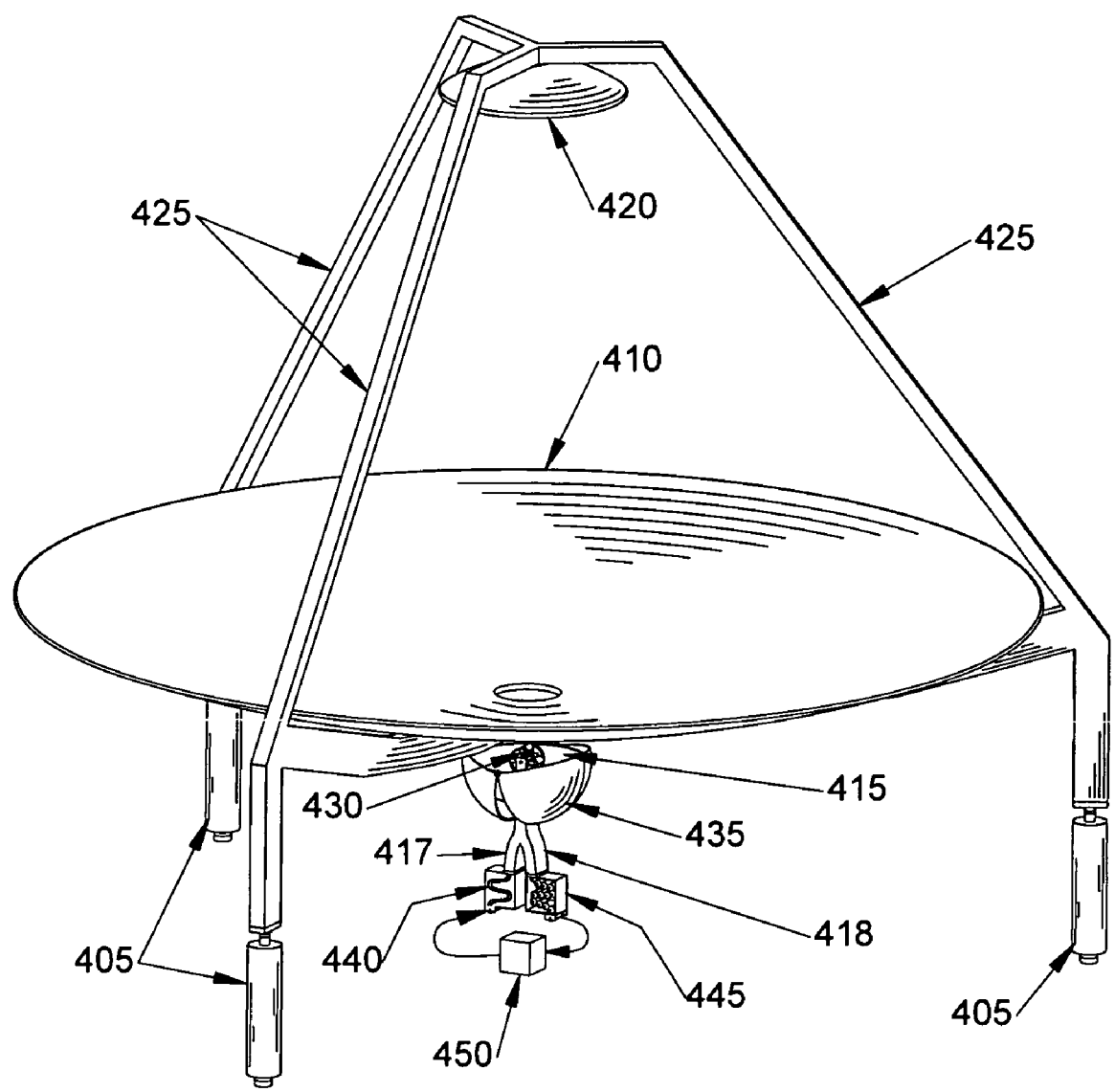
FIG. 5 shows an embodiment with a primary and secondary parabolic mirror supported by legs and struts.

Referring to FIG. 5, this embodiment shows another portable system. In this system, three rigid and height adjustable legs 405 support a parabolic mirror 410 that reflects solar energy onto a secondary mirror 420. The secondary mirror 420 is attached to a triple support strut system 425. Preferably, this system secondary mirror 420 reflects the collected solar energy down through an opening 412 in the secondary mirror 410. The solar energy reflects from the secondary mirror 420 to a tertiary reflector 415. The tertiary reflector 415 is a parabolic mirror that collects the solar energy from the secondary mirror 420 and reflects the collected energy onto a heat storage container 430.

There is also an insulating lid 435 that fits over the top of the tertiary reflector 415. The insulating lid 435 includes an automatic closing mechanism sensitive to either solar energy impacting the tertiary reflector 415 or the temperature of the heat storage container 430. This closing mechanism will close the insulating lid 435 over the storage container 430 to prevent heat loss caused by cloud cover or other loss of solar energy that leads to loss of heat from the heat storage container 430 and reopen the insulating lid 435 once the solar energy increases.

The heat storage container 430 is moved from a solidified storage and return area 440 to the collection point above the tertiary reflector 415 by a conveyor system. The conveyor system passes through a first support leg 417 to above the tertiary reflector 415 where the heat storage container 430 is heated. Once the heat storage container 430 is heated and the metal alloy within it is molten or heated to a desired temperature, the conveyor system moves it down through a second support leg 418 to molten storage area 445. The molten storage area 445 is insulated to help contain the heat of the heat storage containers 430. These heated heat storage containers 430 are then moved from the heat storage area by the conveyor system or another conveyor or similar transporting system to a heat engine application 450 that usefully employs the heat energy. After being used and cooled, the heat storage containers 430 are transported back to the solidified storage and return area 440 for recycling and reheating.

Figure 6:
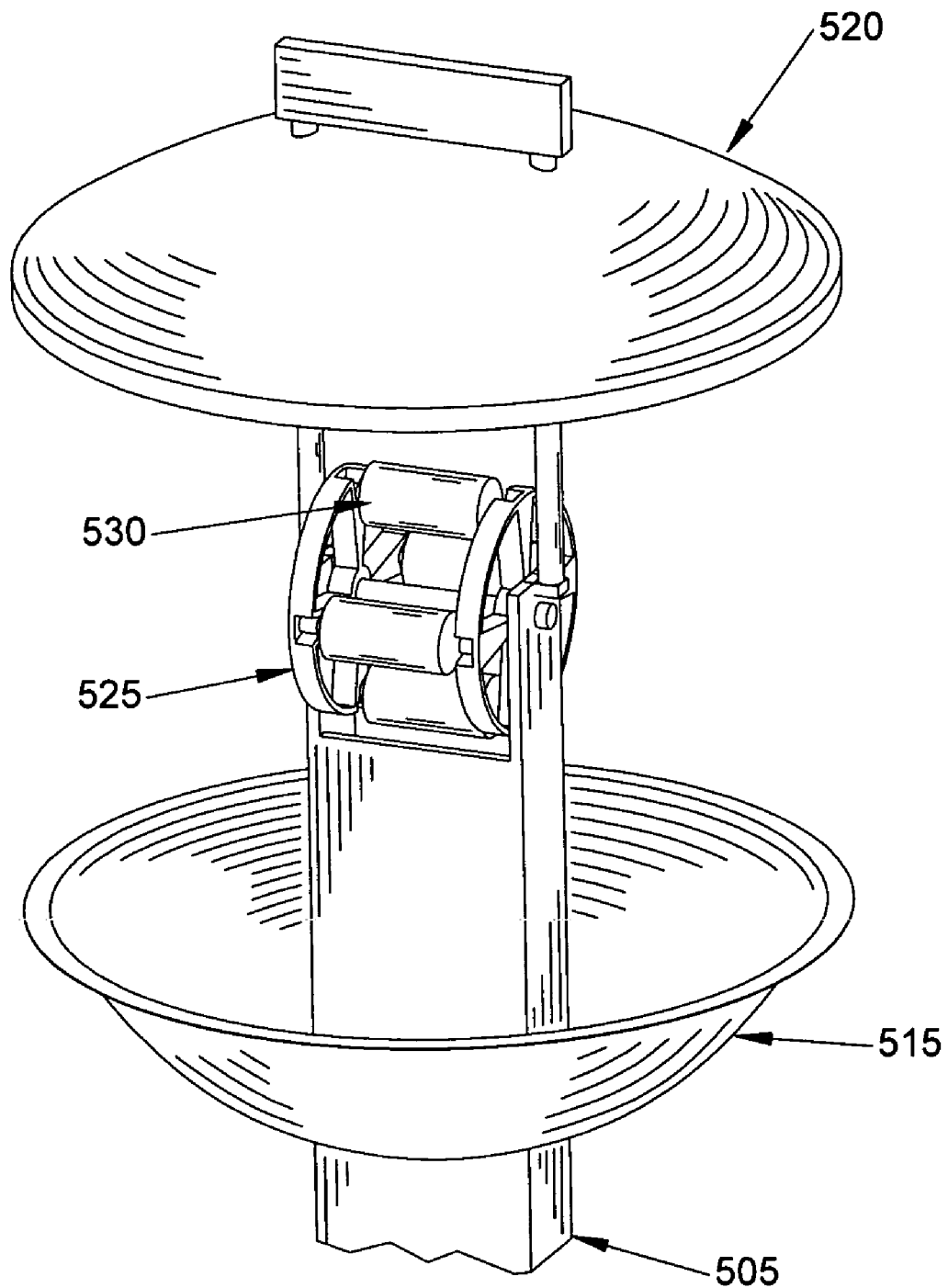
FIG. 6 shows increased detail of the solar collection point and a combination secondary mirror and insulating lid.

FIG. 6 shows more details on the embodiment of the tertiary reflector, secondary mirror, and conveyor system. The transfer tube 505 serves as a support for the remaining structural elements. The tertiary reflector 515 reflects solar energy from the combination insulating lid and secondary reflector 520. The combination insulating lid and secondary reflector 520 includes a mechanism to automatically close over the tertiary reflector 515 when either the solar energy level falls below a certain level or the temperature cools to a specified point and will reopen once the solar energy level increases. A conveyor system 525 rotates heat storage containers 530 into and out of the solar collection point at the top of the conveyor system. The conveyor system control system includes a temperature sensitive control that activates and rotates heat storage containers 530 when the temperature reaches a specified point.

Figure 7:
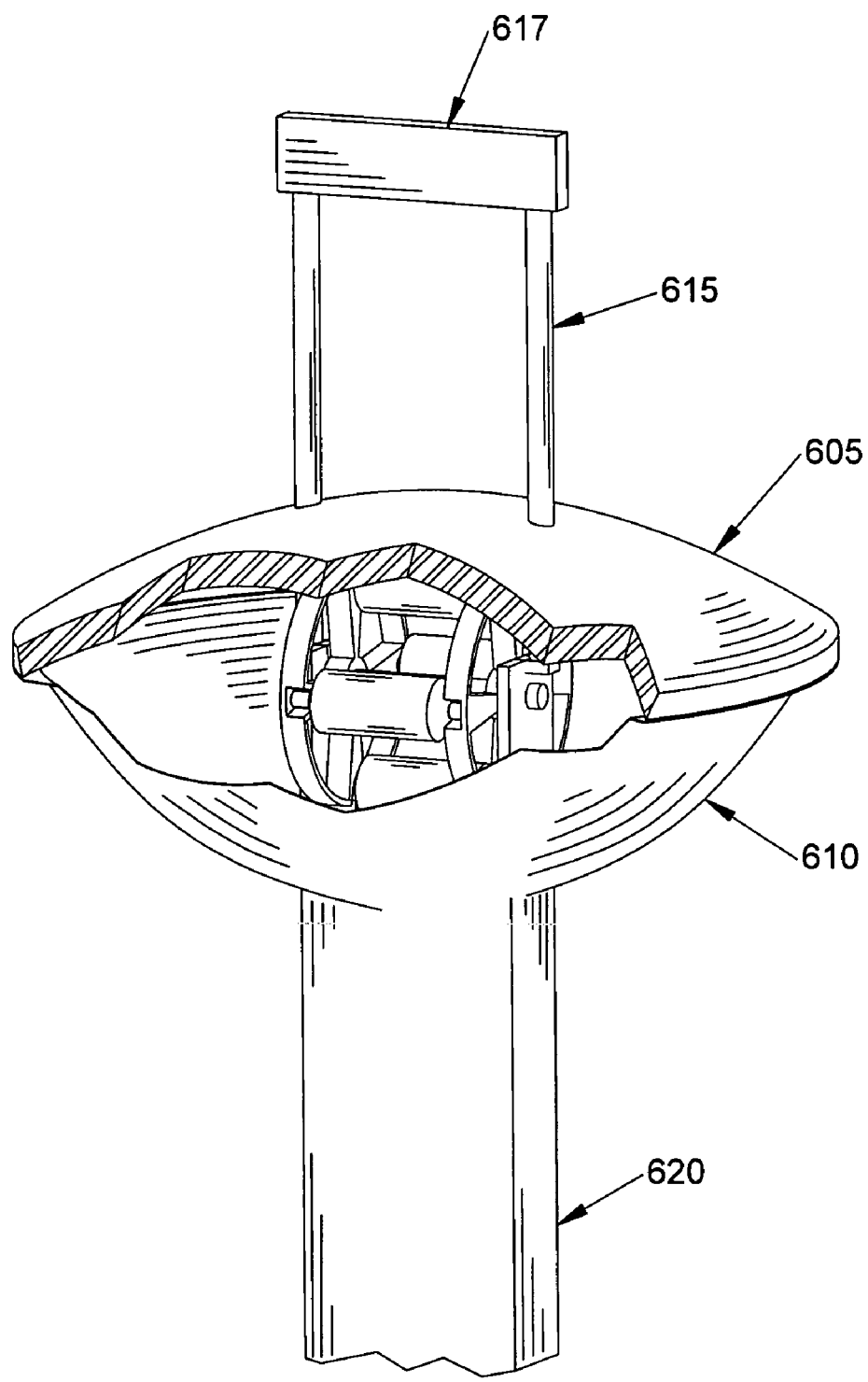
FIG. 7 shows the embodiment of FIG. 6 with the lid lowered into place.

FIG. 7 shows the embodiment of FIG. 6 with the heat collection point closed. The combination insulating lid and secondary reflector 605 has been lowered to stop heat loss. The combination insulating lid and secondary reflector 605 operates to lower onto the tertiary reflector 610 along the supporting brackets 615. The mechanism for lowering the tertiary reflector 610 can be located within the top of the supporting bracket 617, within the combination insulating lid and secondary reflector 605, or within the transfer tub 620. However, a sensor must be located proximate to the heat storage container that is either sensitive to sunlight intensity or temperature.

Figure 8:
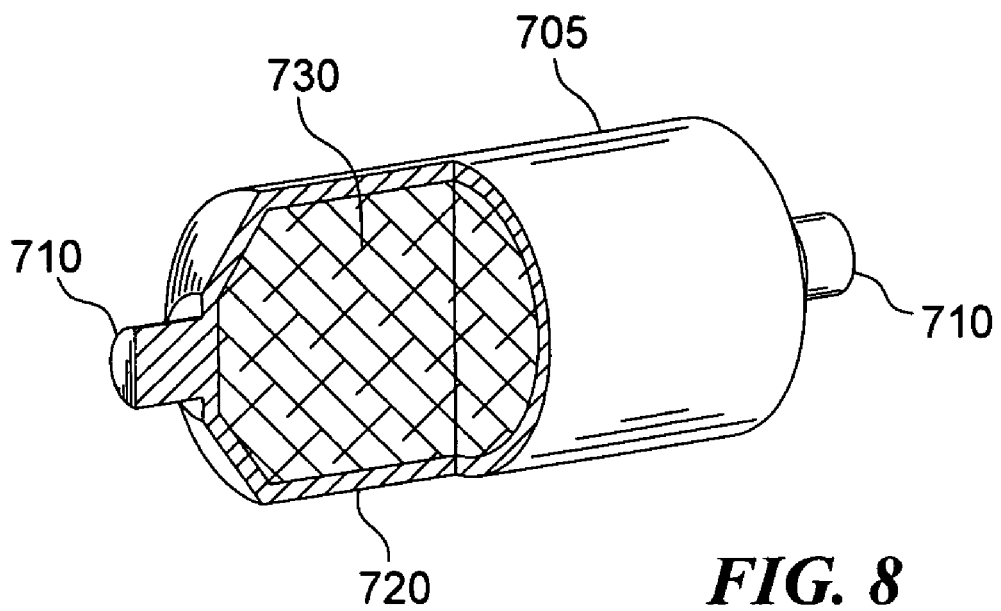
FIG. 8 shows an embodiment of a heat storage container with a rigid metal outer shell.

FIG. 8 shows an embodiment for a heat storage container. The heat storage container 705 includes a pair of external integral moving lugs 710 that lock into the conveyor system. In this embodiment, the container has an outer shell 720 composed of stainless steel or a copper-based alloy. This outer shell must be made from a material with a higher melting point than the internal alloy mixture, and, although other metals may be used for the outer shell, stainless steel or a copper-based alloy are preferred. Other potential metals include titanium or titanium alloys, plain steel, or even iron. The core of the container is composed of an aluminum alloy 730. The aluminum alloy has a relatively high heat of fusion so that the device can absorb or release a large amount of heat within a narrow temperature range.

This embodiment of the heat storage container 705 also requires a low-pressure gas void area to compensate for the thermal expansion of the aluminum alloy within the container during heating. Alternatively, there could be a vacuum void space within the container 705 to compensate for the thermal expansion. The size of the heat storage container 705 is variable and dependent on the overall size of the solar installation and the power demands of the application, but it is envisioned that the heat storage container will vary between having a volume of 250 ml (milliliters) to 3000 ml.

Figure 9:
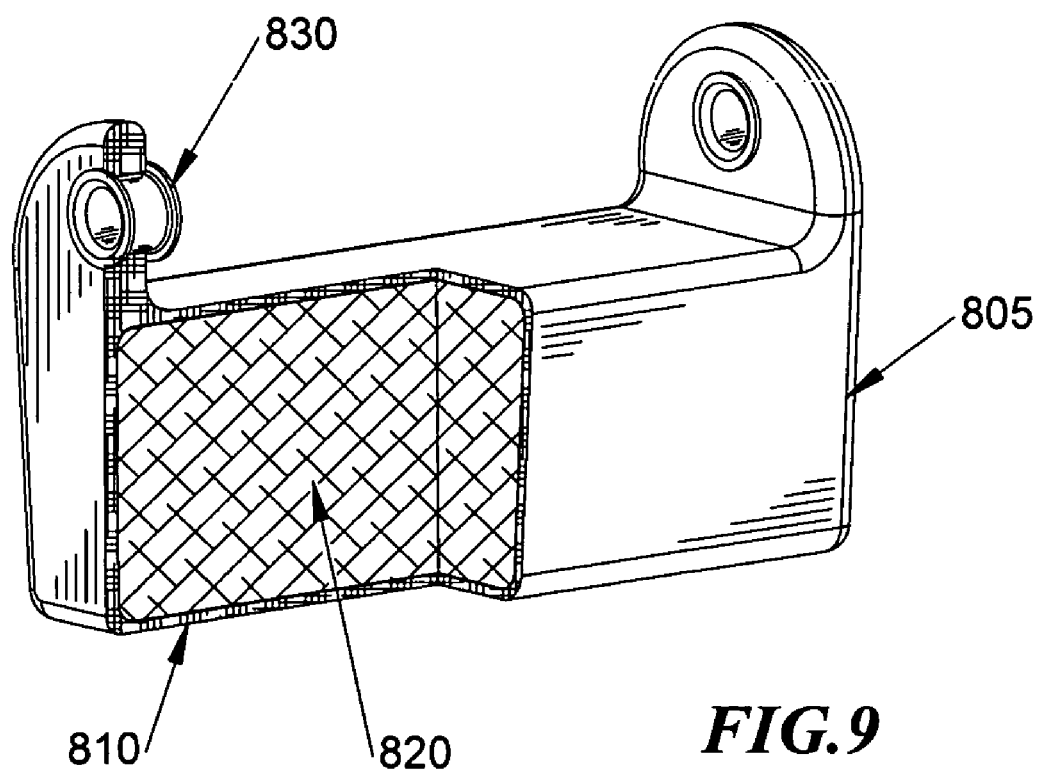
FIG. 9 shows an embodiment of a heat storage container with a flexible carbon fiber outer shell.

FIG. 9 show another embodiment for a heat storage container constructed from carbon fibers. The heat storage container 805 has an outer shell 810 formed from a double layer of carbon fiber. The inner core 820 is composed of aluminum or an aluminum alloy. The heat storage container 805 also uses reinforced, insulated eyelets 830 for grasping and moving the container 805.

For this embodiment, there is no requirement for void space for thermal expansion, since the soft-sided structure composed of carbon fibers can expand and contract in response to the thermal expansion or contraction. For this type of container, the non-rigid carbon-fiber container would primarily rely on surface tension and small pore size to retain the molten core.

The carbon fiber offers advantages of high heat conduction, high melting point, and high strength per weight. A disadvantage is a need for operation in either an inert gas atmosphere environment or vacuum. However, it is envisioned that such a light-weight configuration may be useful in space-based applications such as lunar basing or orbital platforms.

Figure 10:
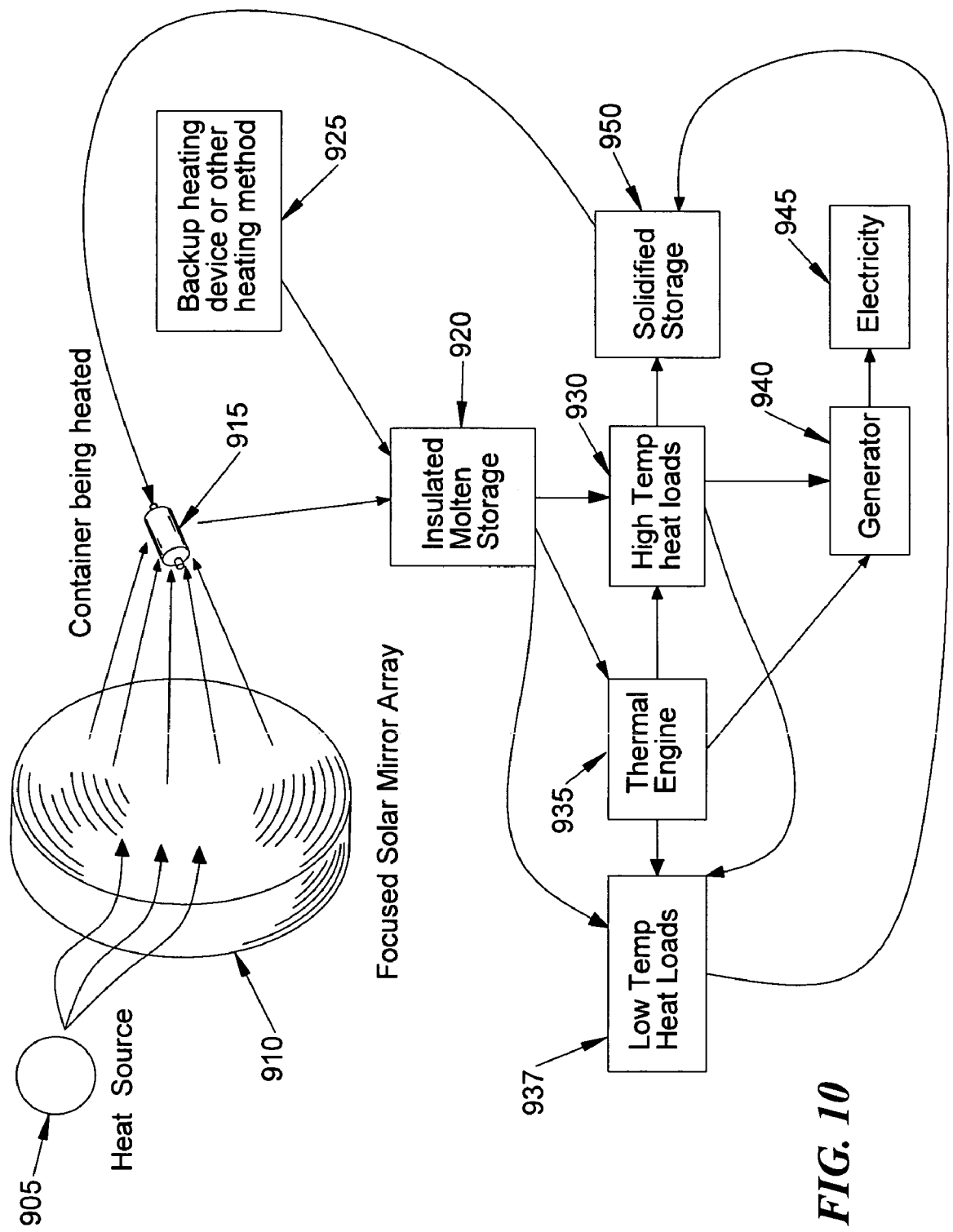
FIG. 10 is a graphic diagram showing the operation of the invention.

FIG. 10 graphically shows how the system harnesses solar energy. A heat source 905, the sun in these embodiments, impacts onto a solar mirror reflector system and heats the heat storage container 915 past the melting point of the aluminum alloy mixture in the core. In the preferred embodiment, the heat storage container 915 travels on a conveyor system and the next heat storage container transferred from solidified storage 950 replaces the original container 915 at the solar heat collection station. The original storage container 915 is then transported to an insulated energy storage area 920.

In the energy storage area 920, the original storage container 915 can be placed adjacent to secondary storage containers to generate high temperature heat loads 930 that are similar or identical to the primary heat storage container 915 except that they may contain alloy mixtures that have lower melting temperatures than the aluminum alloy mixture within the original (primary) container 915. Another embodiment has the secondary storage containers containing the same aluminum alloy as the primary heat storage containers.

The secondary storage containers can be heated by the primary storage container 915 in order to produce a source of low-level heat for applications requiring such. An alternative embodiment heats secondary heat storage containers that have the same aluminum alloy comprising the core of the primary heat storage containers by placing them adjacent to superheated primary storage containers in the storage area until the containers reach the desired temperature level.

The energy storage area 920 can be located below ovens and can transmit heat into ceramic fire-brick just as traditional wood-fired ovens stored the heat of a fire in the masonry. Once the secondary storage containers have reached their respective intended temperatures, the primary storage container 915 or the secondary storage container can be removed from the heat storage area 920 to be used as a heat source for cooking or powering heat engines 935, can be transferred to a generator application 940 to use to generate electricity 945, or can be cooled to a point where they can be used for low temperature heat load applications 937.

Alternatively, the primary storage container 915 can be moved directly from heat storage area 920 to utilize in high temperature heat load applications 930 or in a thermal engine 935 without any secondary storage containers. There is no absolute requirement for secondary storage containers within the system, and all energy applications may utilize the primary storage container 915 when at an acceptable temperature.

Over time, as the primary storage container 915 reaches lower temperatures, it can be used for low temperature heat load applications 937 such as absorption refrigeration, water heating, and drying garbage, waste, and biomass. Alternatively, low temperature heat, which is discharged from absorption units or heat-powered engines, can similarly be used to dry garbage, waste, and biomass, thereby producing a viable backup fuel as well as solving a disposal issue.

Furthermore, any secondary storage containers, which may contain alloy mixtures with lower melting temperatures, can be removed from the energy storage area and used in the applications requiring lower temperatures 937, such as absorption refrigeration, absorption cooling, water heating, and extracting moisture from garbage, waste, and biomass.

Once cooled to point of solidification or are no longer useful for transferring stored energy for either high temperature applications 930 or low temperature applications 937, the storage containers are transferred to solidified container storage 950. This storage area stores storage containers 915 while not in use and are kept there until re-circulated through the system. Alternatively, there may not be any such storage area 950, and storage containers are simply re-circulated once cooled.

For this application, other heat sources are possible, but regardless of the embodiment selected to heat the heat storage containers, the invention includes a backup heating system 925 in order to provide an alternative source of energy in case the primary source of energy is unavailable. The preferred embodiment of the backup heating system 925 is a fuel-based, high temperature heating system that can not only provide heat to the heat storage containers but also can be used as a direct source of heat.

While the invention has been particularly shown and described with respect to preferred embodiments, it will be readily understood that minor changes in the details of the invention may be made without departing from the spirit of the invention. Having described the invention,

I claim:

1. A system for transporting and storing heat energy comprising:
   a conveying system that transports one or more heat storage containers between a solar heating station and a heat dependent use application, said heat storage container having a cylindrical body section and an insulated eyelet on the ends of the cylindrical body which are used for grasping and moving the heat storage container during transport;
   one or more insulated energy storage areas designed to hold at least one of said heat storage containers during periods of use or non-use;
   a solar collection and reflecting mirror arrangement employing at least one primary mirror, at least one secondary mirror, and at least one tertiary mirror to collect and concentrate solar energy onto said solar heating station to heat at least one of said heat storage container; and
   an insulated enclosure lid capable of covering said solar heating station when solar heating decreases, said tertiary mirror is located on an inner surface of the insulated enclosure lid.

2. The system for transporting and storing heat energy of claim 1 further comprising a backup heat source to heat said first heat storage container or provide direct heat in situations in which the primary solar energy absorption system is unavailable or non-functioning.

3. The system for transporting and storing heat energy of claim 1 wherein one of the heat storage containers has an outer shell formed of carbon fiber and an inner core composed of an aluminum-based composition.

4. The system for transporting and storing heat energy of claim 1 further comprising:
   a two-axis sun tracking system located under at least one mirror to track the movement of the sun and move the orientation of the mirror in coordination with the movement of the sun.

5. The system for transporting and storing heat energy of claim 1 further comprising:
   a movable secondary mirror that can shift reflection of solar energy between two separate solar heating stations.

6. The system for transporting and storing heat energy of claim 1 wherein a primary mirror comprises a plurality of assembled mirror modules.

7. The system for transporting and storing heat energy of claim 1 wherein a secondary mirror comprises a plurality of assembled mirror modules.

8. An apparatus for transporting and storing heat energy comprising:
   one or more heat storage containers, said heat storage containers having a cylindrical body with eyelets located on the ends of the cylindrical body for grasping the heat storage containers during transport, and said heat storage containers having a core of aluminum;
   a solar energy collection system comprised of a first mirror reflecting solar energy to a second mirror, said second mirror directing solar energy toward the one or more heat storage containers to heat said heat storage containers to a specified temperature for a desired use;
   an insulating lid controlled by a sensor responsive to an environmental condition to close over said heat storage container to prevent heat loss; and
   a backup heat source to heat said first heat storage containers in situations in where a primary solar energy absorption system is unavailable or non-functioning.

9. The apparatus for transporting and storing heat energy of claim 8 further comprising:
   at least one storage area for storing said heat storage containers.

10. The apparatus for transporting and storing heat energy of claim 8 further comprising:
    a third mirror receiving solar energy from the second mirror, and said third mirror reflecting said solar energy to a solar collection point maintaining the heat storage containers.

11. The apparatus for transporting and storing heat energy of claim 8 further comprising:
    a conveying system that transports the heat storage containers to and from a use application by the grasping eyelets on the ends of the heat storage containers, so the system can use heat from said stored heat energy.

12. The apparatus for transporting and storing heat energy of claim 11 further comprising:
    at least one storage area for storing said heat storage containers.

13. The apparatus for transporting and storing heat energy of claim 8 further comprising:
    a second heat storage container used for heat transfer and heated by the heat storage containers for use by a use application.

14. The apparatus for transporting and storing heat energy of claim 8 wherein the environmental condition comprises reduced solar energy.

15. The apparatus for transporting and storing heat energy of claim 8 wherein the environmental condition comprises a lowered temperature of the first heat storage container.

16. The apparatus for transporting and storing heat energy of claim 8 wherein at least one mirror includes a plurality of assembled mirror modules.

17. The apparatus for transporting and storing heat energy of claim 8 wherein at least one mirror includes a two-axis sun tracking mechanism that moves the mirror to follow the movement of the sun.

18. A method for transporting, storing and releasing stored heat energy using a solar collection apparatus that direct solar energy at heating storage containers, comprising the steps of:
    providing an arrangement of three reflecting mirrors collecting and reflecting solar energy onto a solar energy collection point and locating one of the three reflecting mirrors underneath the solar collection point;
    providing a heat storage container to heat at said solar energy collection point to a temperature required for a use application, said heat storage containers having a cylindrical body and two insulated grasping eyelets located on the ends of the cylindrical body of the heat storage containers, and said outer shell of the heat storage container is composed of steel, stainless steel, iron, titanium, or carbon fiber;
    conveying through the use of the insulated grasping eyelets the heat storage container to said use application for use through the release of the heat energy stored in the heat storage containers; and
    storing said heat storage container during a period of non-use before recycling for reheating and reuse in said use application preventing heat loss from a heated heat storage container by enclosing said heat storage container at the solar energy collection point using a movable lid fitting over the reflecting mirror located under the solar collection point to form an insulating container; and closing said lid in response to a lower temperature or a decreased solar energy level.

19. The method for transporting, storing and releasing stored heat energy of claim 18 wherein the outer shell of the heat storage container comprises a combination of two or more of the following materials:
   steel;
   stainless steel;
   iron;
   titanium; or
   carbon fiber.

20. The method for transporting, storing and releasing stored heat energy of claim 18 wherein the inner core of the heat storage container comprises aluminum.

21. The method for transporting, storing and releasing stored heat energy of claim 18 further comprising the step of:
   providing a lid to cover the heat collection point having one or more of the heat storage containers, said lid closing in response to a decrease in the temperature of the heat storage containers.

22. The method for transporting, storing and releasing stored of claim 18 further comprising the step of:
   providing a lid to cover the heat collection point having one or more of the heat storage containers, said lid closing in response to a decrease in the solar energy on the solar energy collection point 23. The method for transporting, storing and releasing stored energy of claim 18 wherein the three reflecting mirrors comprise a primary mirror, a secondary mirror, and a tertiary mirror.

24. The method for transporting, storing and releasing stored heat energy of claim 23 further comprising the steps of:
   collecting solar energy with at least one primary mirror to reflect toward a secondary mirror;
   reflecting solar energy from the secondary mirror to the tertiary mirror; and
   reflecting solar energy from the tertiary mirror to the solar energy collection point.

25. The method for transporting, storing and releasing stored heat energy of claim 23 further comprising the step of:
   reflecting solar energy from at least two secondary mirrors toward a single solar energy collection point.

26. The method for transporting, storing and releasing stored heat energy of claim 23 further comprising the step of:
   reflecting solar energy from at least two secondary mirrors onto a single tertiary mirror.

27. The method for transporting, storing and releasing stored heat energy of claim 18 further comprising the step of:
   heating a cooled heat storage container with a heated heat storage container conveyed from the solar energy collection point.

28. The method for transporting, storing and releasing stored heat energy of claim 18 further comprising the steps of:
   reflecting solar energy from at least two secondary mirrors toward a single solar energy collection point.

29. The method for transporting, storing and releasing heat energy of claim 18 wherein at least one reflecting mirror comprises at least one of the following:
   an inflatable structure with a parabolic reflecting surface;
   a plurality of assembled mirror modules;
   a glass mirror;
   an insulated parabolic mirrored surface on top of an insulating material;
   a composite; and
   a polished metal.

* * * * *